United States Patent
Tsukamoto et al.

(10) Patent No.: US 11,603,439 B2
(45) Date of Patent: Mar. 14, 2023

(54) PREPREG AND PRODUCING METHOD THEREOF

(71) Applicant: JAPAN MATEX CO., LTD., Sennan (JP)

(72) Inventors: Katsuro Tsukamoto, Sennan (JP); Hiroaki Tsukamoto, Sennan (JP)

(73) Assignee: JAPAN MATEX CO., LTD., Osaka (JP)

( * ) Notice: Subject to any disclaimer, the term of this patent is extended or adjusted under 35 U.S.C. 154(b) by 509 days.

(21) Appl. No.: 16/796,132

(22) Filed: Feb. 20, 2020

(65) Prior Publication Data

US 2020/0270412 A1   Aug. 27, 2020

(30) Foreign Application Priority Data

Feb. 21, 2019 (JP) .............................. JP2019-029855

(51) Int. Cl.
| | | |
|---|---|---|
| *C08J 5/06* | (2006.01) | |
| *D03D 1/00* | (2006.01) | |
| *C08J 3/28* | (2006.01) | |
| *D03D 15/00* | (2021.01) | |
| *D03D 15/275* | (2021.01) | |
| *C08J 5/24* | (2006.01) | |

(52) U.S. Cl.
CPC . *C08J 5/06* (2013.01); *C08J 3/28* (2013.01); *C08J 5/248* (2021.05); *D03D 1/0094* (2013.01); *D03D 15/00* (2013.01); *D03D 15/275* (2021.01); *C08J 2300/22* (2013.01); *C08J 2400/24* (2013.01)

(58) Field of Classification Search
CPC ....... C08J 5/06; C08J 5/248; C08J 3/28; C08J 2300/22; C08J 2400/24; D03D 15/275; D03D 15/00; D03D 1/0094; D02G 3/06; D02G 3/16; D02G 3/286; D02G 3/38; D02G 3/402; D06M 11/45; D06M 11/50; D06M 13/10; D10B 2101/12; D10B 2505/02
USPC ....... 428/370, 357, 359, 361, 364, 368, 392, 428/378, 380, 375; 57/217, 223, 232, 57/243, 250, 903; 8/115.51, 115.6
See application file for complete search history.

(56) References Cited

FOREIGN PATENT DOCUMENTS

| | | |
|---|---|---|
| CN | 08431312 A | 8/2018 |
| JP | S60-32831 A | 2/1985 |

(Continued)

OTHER PUBLICATIONS

Office Action for the Korean application No. 10-2020-0020083 dated Apr. 21, 2021.

(Continued)

*Primary Examiner* — Camie S Thompson
(74) *Attorney, Agent, or Firm* — Kelly & Kelley, LLP (57) ABSTRACT

A prepreg according to the invention comprises: a raw yarn treated by a sizing agent; a thermoplastic resin material; and a thermosetting resin material; wherein the thermoplastic resin material coats at least a part of an outer peripheral surface of the raw yarn, wherein the thermosetting resin material coats at least a part of an outer peripheral surface of the thermoplastic resin material, or wherein the thermosetting resin material coats at least a part of the outer peripheral surface of the raw yarn, wherein the thermoplastic resin material coats at least a part of an outer peripheral surface of the thermosetting resin material, and wherein the thermosetting resin material is polymerized by heating.

6 Claims, 7 Drawing Sheets

(56) References Cited

FOREIGN PATENT DOCUMENTS

| JP | H1-174413 A | 7/1989 |
|----|-------------|--------|
| JP | 2016-65349 A | 4/2016 |
| JP | 2019-18575 A | 2/2019 |
| WO | 2017/188861 A1 | 11/2017 |
| WO | 2018/037658 A | 3/2018 |
| WO | 2018/037658 A1 | 3/2018 |

OTHER PUBLICATIONS

Office Action for the Chinese application No. 202010098464.6 dated Jun. 7, 2022.

Office Action for the Japanese application No. 2019-029855 date of drafting Jul. 29, 2019.

PREPREG AND PRODUCING METHOD THEREOF

BACKGROUND OF THE INVENTION

Field of the Invention

The present invention relates to a prepreg and a producing method thereof, more specifically, a prepreg having a longer usable period (lifespan) as a molding material for FRP than a conventional prepreg, and a producing method thereof.

Traditionally, fiber reinforced plastics (FRP) have been used in various fields of building materials, airplanes, vessels, vehicles, sporting goods, and various printed circuit boards, etc.

FRP is a composite material with enhanced strength obtained by mixing a fiber, such as a glass fiber and a carbon fiber, with plastics. A prepreg has been widely used as a material for FRP.

A prepreg refers to a molding material for FRP, where a thermosetting resin material such as epoxy mixed with additives such as a curing agent and a colorant, is equally impregnated in a fibrous reinforcement such as a glass fiber and a carbon fiber, then heated or dried into a semi-cured state.

A prepreg has been widely used as a molding material for FRP because it can be molded into FRP accurately.

Therefore, a prepreg having more remarkable characteristics as a molding material for FRP has been developed.

Description of Related Art

For example, Japanese Unexamined Patent Application No. 1-174413 discloses a composite yarn prepreg produced by impregnating a thermosetting resin material with a fiber yarn into a semi-cured state, characterized by that the fiber yarn has a yarn bundle as a core yarn containing at least an inorganic fiber filament in a substantially untwisted and paralleled state and that the fiber yarn is a composite yarn covered by a sheath yarn winding around the fiber yarn.

The composite yarn prepreg described in Japanese Unexamined Patent Application No. 1-174413 prevents damage to the inorganic fiber filament at impregnation process, has an excellent passability in prepreg processes, is easy to produce, and causes no yarn splitting or fiber splitting when it is rewound for molding after it is wound on a bobbin and packaged. Accordingly, the prepreg enables smooth release without causing any damage to the inorganic fiber filament.

SUMMARY OF THE INVENTION

As mentioned above, the prepreg having more remarkable characteristics as the molding material for FRP has been developed.

For the conventional prepreg including the prepreg described in JP No. 1-174413, the thermosetting resin material is in the uncured state.

Accordingly, there was a problem that the curing reaction of the thermosetting resin material of the prepreg proceeded over time, and the prepreg (stored at room temperature) over 15 days after production could not be used as the molding material for FRP.

This present invention is made to solve the problem of the conventional technology as mentioned above, and offers the prepreg having a longer usable period (lifespan) as the molding material for FRP than the conventional prepreg, and a producing method thereof.

THE MEANS FOR SOLVING THE PROBLEM

The invention according to a first aspect relates to a prepreg comprising a raw yarn treated by a sizing agent; a thermoplastic resin material; and a thermosetting resin material;

wherein the thermoplastic resin material coats at least a part of an outer peripheral surface of the raw yarn, wherein the thermosetting resin material coats at least a part of an outer peripheral surface of the thermoplastic resin material, or wherein the thermosetting resin material coats at least a part of the outer peripheral surface of the raw yarn, wherein the thermoplastic resin material coats at least a part of an outer peripheral surface of the thermosetting resin material, wherein the thermosetting resin material is polymerized by heating, wherein the thermoplastic resin material is S-twisted or Z-twisted on at least a part of the outer peripheral surface of the raw yarn, and/or wherein the thermosetting resin material is S-twisted and Z-twisted on at least a part of the outer peripheral surface of the thermoplastic resin material, or wherein the thermosetting resin material is S-twisted and Z-twisted on at least a part of the outer peripheral surface of the raw yarn, and/or wherein the thermoplastic resin material is S-twisted and Z-twisted on at least a part of the outer peripheral surface of the thermosetting resin material.

The invention according to a second aspect relates to the prepreg according to the first aspect, wherein the thermoplastic resin material includes S-twisted and Z-twisted portions on at least a part of the outer peripheral surface of the raw yarn, and/or wherein the thermosetting resin material includes S-twisted and Z-twisted portions on at least a part of the outer peripheral surface of the thermoplastic resin material.

The invention according to a third aspect relates to the prepreg according to the first aspect, wherein the thermosetting resin material includes S-twisted or Z-twisted portions on at least a part of the outer peripheral surface of the raw yarn, and/or wherein the thermoplastic resin material includes S-twisted or Z-twisted portions on at least a part of the outer peripheral surface of the thermosetting resin material.

The invention according to a fourth aspect relates to the prepreg according to any one of the first to the third aspect, wherein the sizing agent contains potassium persulfate, alumina sol, and PVA.

The invention according to a fifth aspect relates to the prepreg according to any one of the first to the fourth aspect, wherein the raw yarn is subjected to a corona discharge treatment.

The invention according to a sixth aspect relates to the prepreg according to any one of the first to the fifth aspect, wherein the thermoplastic resin material and/or the thermosetting resin material are subjected to the corona discharge treatment.

The invention according to a seventh aspect relates to the prepreg according to any one of the first to the sixth aspect, wherein the prepreg is shaped into a woven fabric.

The invention according to an eighth aspect relates to the prepreg according to any one of the first to the sixth aspect, wherein the prepreg is shaped into a knitted fabric.

The invention according to a ninth aspect relates to a method of producing a prepreg, comprising: a first step of subjecting a sizing treatment to a raw yarn;

a second step of coating at least a part of an outer peripheral surface of the raw yarn subjected to the sizing treatment with thermoplastic resin material; and a third step of coating at least a part of an outer peripheral surface of the thermoplastic resin material with a thermosetting resin material, wherein the thermosetting resin material is polymerized by heating, wherein the second step is a step to S-twist and Z-twist, and coat at least a part of the outer peripheral surface of the raw yarn subjected to the sizing treatment with the thermoplastic resin material, and/or, wherein the third step is a step to S-twist and Z-twist, and coat at least a part of the outer peripheral surface of the thermoplastic resin material with the thermosetting resin.

The invention according to a tenth aspect relates to the method of the ninth aspect, wherein the second step is a step to coat at least a part of the outer peripheral surface of the raw yarn subjected to the sizing treatment with the S-twisted thermoplastic resin material and the Z-twisted thermoplastic resin material, and/or the third step is a step to coat at least a part of the outer peripheral surface of the thermoplastic resin material with the S-twisted thermosetting resin material and the Z-twisted thermosetting resin material.

The invention according to an eleventh aspect relates to a method of producing a prepreg, comprising: a first step of subjecting a sizing treatment to a raw yarn;

a second step of coating at least a part of an outer peripheral surface of the raw yarn subjected to the sizing treatment with a thermosetting resin material;

a third step of coating at least a part of an outer peripheral surface of the thermosetting resin material with a thermoplastic resin material, wherein the thermosetting resin material is polymerized by heating, wherein the second step is a step to S-twist and Z-twist, and coat at least a part of the outer peripheral surface of the raw yarn subjected to the sizing treatment with the thermosetting resin material, and/or wherein the third step is a step to S-twist and Z-twist, and coat at least a part of the outer peripheral surface of the thermosetting resin material with the thermoplastic resin material.

The invention according to a twelfth aspect relates to the method of the eleventh aspect, wherein the second step is a step to coat at least a part of the outer peripheral surface of the raw yarn subjected to the sizing treatment with the S-twisted thermosetting resin material and the Z-twisted thermosetting resin material, and/or, wherein the third step is a step to coat at least a part of the outer peripheral surface of the thermosetting resin material with the S-twisted thermoplastic resin material and the Z-twisted thermoplastic resin material.

The invention according to a thirteenth aspect relates to the method of any one of the ninth to twelfth aspect, wherein the sizing agent used for the sizing treatment in the first step contains potassium persulfate, alumina sol, and PVA.

The invention according to a fourteenth aspect relates to the method of any one of the ninth to thirteenth aspect, further comprising a step of subjecting to corona discharge treatment the raw yarn subjected to the sizing treatment after the first step.

Effects of the Invention

According to the invention of the first aspect, a prepreg comprises a raw yarn treated by a sizing agent; a thermoplastic resin material; and a thermosetting resin material; the thermoplastic resin material coats at least a part of an outer peripheral surface of the raw yarn, the thermosetting resin material coats at least a part of an outer peripheral surface of the thermoplastic resin material, or the thermosetting resin material coats at least a part of the outer peripheral surface of the raw yarn, the thermoplastic resin material coats at least a part of an outer peripheral surface of the thermosetting resin material, the thermosetting resin material is polymerized by heating, and thus the curing reaction of the thermosetting resin material does not proceed over time unlike the conventional prepreg.

The thermoplastic resin material coats at least a part of the outer peripheral surface of the raw yarn subjected to the sizing treatment or the outer peripheral surface of the thermosetting resin material, and thus even if the thermosetting resin material is polymerized by heating, the thermoplastic resin material becomes a molding material to mold a prepreg into a desired shape, enabling the molding of the prepreg into a desired shape.

In addition, the prepreg may be heated, not need to be fired, to a temperature when the thermoplastic resin material is softened, allowing easier molding than the conventional prepreg.

Furthermore, the thermoplastic resin material is S-twisted and Z-twisted on at least a part of the outer peripheral surface of the raw yarn, and/or the thermosetting resin material is S-twisted and Z-twisted on at least a part of the outer peripheral surface of the thermoplastic resin material, or the thermosetting resin material is S-twisted and Z-twisted on at least a part of the outer peripheral surface of the raw yarn, and/or the thermoplastic resin material is S-twisted and Z-twisted on at least a part of the outer peripheral surface of the thermosetting resin material, thereby enabling the prepreg to be easily molded.

Therefore, the prepreg according to the invention has a remarkable effect that it has a longer usable period (lifespan) as the molding material for FRP than the conventional prepreg and that it can be easily molded.

According to the invention of the second aspect, the thermoplastic resin material includes S-twisted and Z-twisted portions on at least a part of the outer peripheral surface of the raw yarn, and/or the thermosetting resin material includes S-twisted and Z-twisted portions on at least a part of the outer peripheral surface of the thermoplastic resin material, thereby enabling the prepreg to be easily molded.

According to the invention of the third aspect, the thermosetting resin material includes S-twisted or Z-twisted portions on at least a part of the outer peripheral surface of the raw yarn, and/or the thermoplastic resin material includes S-twisted or Z-twisted portions on at least a part of the outer peripheral surface of the thermosetting resin material, thereby enabling the prepreg to be easily molded.

According to the invention of the fourth aspect, the sizing agent contains potassium persulfate, alumina sol, and PVA, and thus an OH group contained in the sizing agent works during molding, enabling firm bonding of the thermoplastic resin material and the raw yarn.

According to the invention of the fifth aspect, the raw yarn is subjected to the corona discharge treatment, enabling firmer bonding of the thermoplastic resin material and the raw yarn.

According to the invention of the sixth aspect, the thermoplastic resin material and/or the thermosetting resin material are subjected to the corona discharge treatment, enabling firmer bonding of the thermoplastic resin material with the raw yarn and the thermosetting resin material, and/or of the thermosetting resin material with the thermoplastic resin material.

According to the invention of the seventh aspect, the prepreg is shaped into a woven fabric, enabling the prepreg that can be molded more easily.

According to the invention of the eighth aspect, the prepreg is shaped into a knitted fabric, enabling the prepreg that can be easily molded.

According to the invention of the ninth aspect, a method of producing a prepreg comprises a first step of subjecting a sizing treatment to a raw yarn; a second step of coating at least a part of an outer peripheral surface of the raw yarn subjected to the sizing treatment with the thermoplastic resin material; and a third step of coating at least a part of an outer peripheral surface of the thermoplastic resin material with the thermosetting resin material, the thermosetting resin material is polymerized by heating, enabling the production of the prepreg of which the curing reaction of the thermosetting resin material does not proceed over time, unlike the conventional prepreg.

Moreover, the thermoplastic resin material coats the outer peripheral surface of the raw yarn subjected to the sizing treatment, and thus even if the thermosetting resin material is polymerized by heating, the thermoplastic resin material becomes a molding material to mold the prepreg into the desired shape, enabling the production of the prepreg to be molded into a desired shape.

In addition, the prepreg may be heated, not need to be fired, to a temperature when the thermoplastic resin material is softened, enabling the production of the prepreg to be molded more easily than the conventional prepreg.

Furthermore, the second step is a step to S-twist and Z-twist, and coat at least a part of the outer peripheral surface of the raw yarn subjected to the sizing treatment with the thermoplastic resin material, and/or, the third step is a step to S-twist and Z-twist, and coat at least a part of the outer peripheral surface of the thermoplastic resin material with the thermosetting resin material, enabling the production of the prepreg to be molded more easily.

Therefore, the prepreg can be produced to have a remarkable effect that it has a longer usable period (lifespan) as the molding material for FRP than the conventional prepreg and that it can be easily molded.

According to the invention of the tenth aspect, the second step is a step to coat at least a part of the outer peripheral surface of the raw yarn subjected to the sizing treatment with the S-twisted thermoplastic resin material and the Z-twisted thermoplastic resin material, and/or the third step is a step to coat at least a part of the outer peripheral surface of the thermoplastic resin material with the S-twisted thermosetting resin material and the Z-twisted thermosetting resin material, enabling the production of the prepreg that can be easily molded.

According to the invention of the eleventh aspect, a method of producing a prepreg comprises a first step of applying a sizing treatment to the raw yarn; a second step of coating at least a part of an outer peripheral surface of the raw yarn subjected to the sizing treatment with the thermosetting resin material; and a third step of coating at least a part of an outer peripheral surface of the thermosetting resin material with the thermoplastic resin material. The thermosetting resin material is polymerized by heating, enabling the production of the prepreg of which the curing reaction of the thermosetting resin material does not proceed over time, unlike the conventional prepreg.

Also, the thermoplastic resin material coats the outer peripheral surface of the thermosetting resin material, and thus, even if the thermosetting resin material is polymerized by heating, the thermoplastic resin material becomes a molding material to mold the prepreg into a desired shape, enabling the production of the prepreg to be molded into a desired shape.

In addition, the prepreg may be heated, not need to be fired, to a temperature when the thermoplastic resin material is softened, enabling the production of the prepreg to be molded more easily than the conventional prepreg.

Furthermore, the second step is a step to S-twist and Z-twist and coat at least a part of the outer peripheral surface of the raw yarn subjected to the sizing treatment with the thermosetting resin material, and/or, the third step is a step to S-twist and Z-twist and coat at least a part of the outer peripheral surface of the thermosetting resin material with the thermoplastic resin material, enabling the production of the prepreg to be molded more easily.

Therefore, the prepreg can be produced to have a remarkable effect that it has a longer usable period (lifespan) as the molding material for FRP than the conventional prepreg and that it can be easily molded.

According to the invention of the twelfth aspect, the second step is a step to coat at least a part of the outer peripheral surface of the raw yarn subjected to a sizing treatment with the S-twisted thermosetting resin material and the Z-twisted thermosetting resin material, and/or the third step is a step to coat at least a part of the outer peripheral surface of the thermosetting resin material with the S-twisted thermoplastic resin material and the Z-twisted thermoplastic resin material, enabling the production of the prepreg that can be easily molded.

According to the invention of the thirteenth aspect, the sizing agent used for the sizing treatment in the first step contains potassium persulfate, alumina sol, and PVA, and thus, an OH group contained in the sizing agent works during molding, enabling firm bonding of the thermoplastic resin material and the raw yarn, enabling the production of the prepreg that can be more easily and more firmly molded.

According to the invention of the fourteenth aspect, the method further comprises a step of subjecting to the corona discharge treatment the raw yarn subjected to the sizing treatment after the first step, enabling more firm bonding of the thermoplastic resin material and the raw yarn, and thus enabling the production of the prepreg that can be more easily and more firmly molded.

DETAILED DESCRIPTION OF THE INVENTION

Hereinafter, preferred embodiments of a prepreg according to present invention (hereinafter simply referred to as prepreg) and a producing method thereof will be described with reference to accompanying drawings.

Figure 1A:
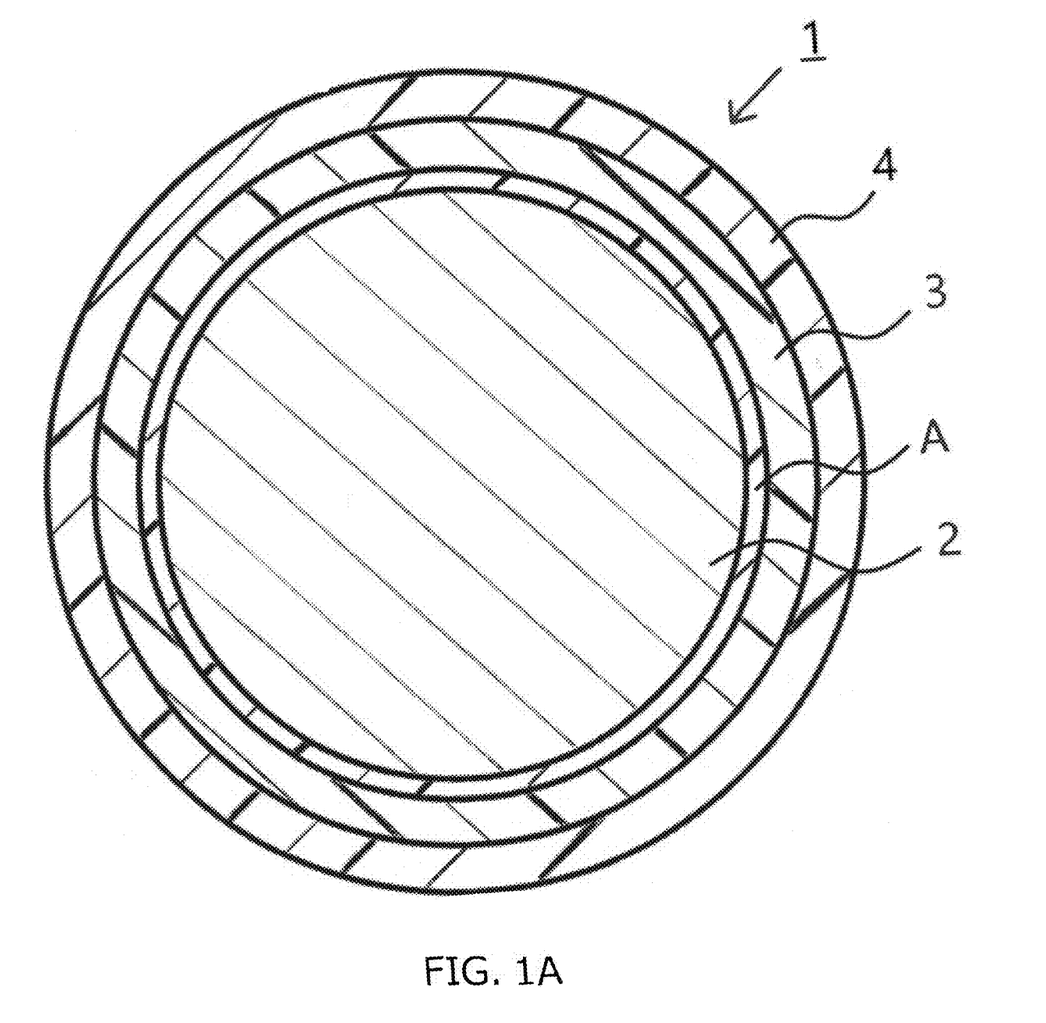
FIG. 1A shows a prepreg that comprises a raw yarn, a thermoplastic resin material, and a thermosetting resin material in this order from the center.
Figure 1B:
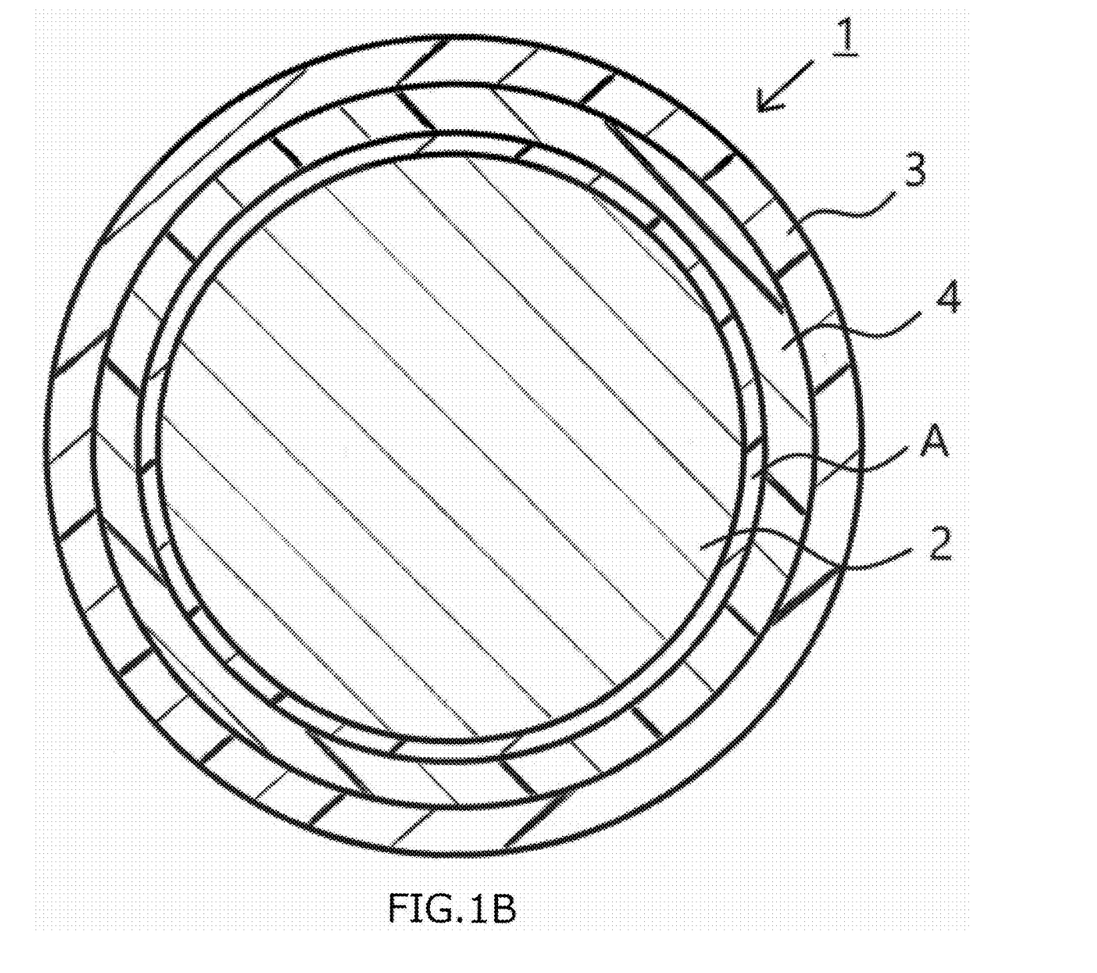
FIG. 1B shows a prepreg that comprises the raw yarn, the thermosetting resin material, and the thermoplastic resin material in this order from the center.

FIG. 1.A and FIG. 1.B are schematic sectional views of a prepreg according to the present invention. FIG. 1.A shows a prepreg that comprises a raw yarn, a thermoplastic resin material, and a thermosetting resin material in this order from the center. FIG. 1.B shows a prepreg that comprises the raw yarn, the thermosetting resin material, and the thermoplastic resin material in this order from the center.

As shown in FIG. 1.A and FIG. 1.B, a prepreg (1) comprises a raw yarn (2) treated by a sizing agent (A), a thermoplastic resin material (3), and a thermosetting resin material (4).

More specifically, in the prepreg (1), the thermoplastic resin material (3) coats at least a part of the outer peripheral surface of the raw yarn (2), and the thermosetting resin material (4) coats at least a part of the outer peripheral surface of the thermoplastic resin material (3) (see FIG. 1.A), or the thermosetting resin material (4) coats at least a part of the outer peripheral surface of the raw yarn (2), and the thermoplastic resin material (3) coats at least a part of the outer peripheral surface of the thermosetting resin material (4) (see FIG. 1.B), and the thermosetting resin material (4) is polymerized by heating.

In the case of the prepreg (1) comprising the compositions shown in FIG. 1.A, thermoplastic resin material may be further provided to coat at least a part of the outer peripheral surface of the thermosetting resin material (4).

The raw yarn (2) used for the prepreg (1) may include, not particularly limited to, a glass fiber, a carbon fiber (PAN-based, Pitch-based), an unwoven fabric, etc., that is typically used as a fiber reinforced material.

For example, a carbon fiber used for the raw yarn (2) can include Regular Tow (RT) such as untwisted carbon fiber 3K (untwisted carbon fiber is 3000 bundles), 6K (6000 bundles), 12K (12000 bundles) and 24K (24000 bundles), etc., and Large Tow (LT) such as 64K (64000 bundles). Any carbon fiber such as an acrylic carbon fiber or a pitch carbon fiber can be used as the raw yarn (2).

The raw yarn (2) used for the prepreg (1) is subjected to the sizing treatment with the sizing agent (A).

With the treatment with the sizing agent (A), an OH group (a functional group) can be added to the raw yarn (2).

This enables the thermoplastic resin material (3) softened by heating and the raw yarn (2) to be bonded firmly by the functional group of the sizing agent (A) when the prepreg (1) is molded, thereby enabling the easy molding of the prepreg (1).

The sizing agent (A) used for the prepreg (1) is normally used as a sizing agent for a carbon fiber, etc. Any sizing agent can be used as long as it can impart the above-mentioned adhesiveness to the thermoplastic resin material (3) and the raw yarn (2).

From the viewpoint that the sizing agent (A) contains the OH group and thus can impart a remarkable adhesiveness to the thermoplastic resin material (3) and the raw yarn (2), it may preferably contain potassium persulfate, alumina sol, and PVA.

A particle diameter and pH of the alumina sol used for the sizing agent (A) may be, but not limited, anything as long as it can have a remarkable effect according to the invention.

Moreover, a shape of an alumina of the alumina sol may be any shape, but not limited to, a tabular, column, fibrous, hexagon tabular shape, etc.

Also, if the alumina sol is fibrous, it is the fibrous crystal. More specifically, it includes alumina fiber formed with non-hydrated alumina and hydrated alumina fiber formed with alumina containing hydrate, etc.

The alumina sol used for the sizing agent (A) includes, but not limited to, for example, alumina sol 10A (Al2O3 conversion weight %: 9.8 to 10.2, particle size: 5 to 15 nm, viscosity of 25° C., mPa/s: <50, pH: 3.4 to 4.2, Kawaken Fine Chemicals Co., Ltd.), alumina sol A2 (Al2O3 conversion weight %: 9.8 to 10.2, particle size: 10 to 20 nm, the viscosity of 25° C., mPa/s: <200, pH: 3.4 to 4.2, Kawaken Fine Chemicals Co., Ltd.), alumina sol CSA-110AD (Al2O3 conversion weight %: 6.0 to 6.4, particle size: 5 to 15 nm, the viscosity of 25° C., mPa/s: <50, pH: 3.8 to 4.5, Kawaken Fine Chemicals Co., Ltd.), alumina sol F1000 (Al2O3 conversion weight %: 4.8 to 5.2, particle size: 1400 nm, the viscosity of 25° C., mPa/s: <1000, pH: 2.9 to 3.3, Kawaken Fine Chemicals Co., Ltd.), alumina sol F3000 (Al2O3 conversion weight %: 4.8 to 5.2, particle size: 2000 to 4500 nm, the viscosity of 25° C., mPa/s: <1000, pH: 2.7 to 3.3, Kawaken Fine Chemicals make) etc. Any alumina sol can be used as long as it is obvious to a person skilled in the art.

The potassium persulfate used for the sizing agent (A) can increase the number of the OH group contained in the sizing (A) since it is a compound containing the OH group. With the increase of chemical bonding (adhesion) by the OH group, the potassium persulfate can impart the remarkable adhesiveness to the raw yarn (2) and the thermoplastic resin material (3).

Instead of the potassium persulfate, or in addition to the potassium persulfate, a compound containing the OH group such as acetic acid, benzoic acid, phenyl phosphonic acid, and benzoyl, etc. may be added to the sizing agent (A).

In such a case, the same effect can be obtained as in the case where the potassium persulfate is added.

The sizing agent (A) contains a polyvinyl alcohol (PVA), which is a thermoplastic resin, as an adhesive component.

PVA has a structural formula shown below and contains a large number of OH groups.

PVA stably remains in an adhesive agent even after blending with the sizing agent (A) and is unlikely to lower the adhesion and the bonding.

Therefore, the sizing agent (A) can be used for a long period.

Use of PVA that is a thermoplastic resin and contains OH groups as the sizing agent (A) eliminates the need of heating in the bonding of the raw yarn (2) and the thermoplastic resin material (3), thereby enabling easier molding of the prepreg (1).

As mentioned above, the sizing agent (A) preferably comprises the potassium persulfate, the alumina sol, and the PVA.

The concentrations of these components are not particularly limited, but if the concentration of the sizing agent (A) is lower than the predetermined range, the adhesion between the raw yarn (2) and the thermoplastic resin material (3) may be decreased.

If the concentration of the sizing agent (A) is higher than the predetermined range, the sizing agent (A) may be unlikely to penetrate into the raw yarn (2).

Therefore, respective components of the sizing agent (A) have suitable ranges for the concentration as shown below.

The concentration of the PVA is preferably 5.0 to 15 wt. %.

The concentration of the alumina sol is preferably 1.0 to 1.5 wt. %.

If the concentration of the alumina sol is lower than 1.0 wt. %, the adhesion between the raw yarn (2) and thermoplastic resin material (3) may be decreased.

Also, even if the concentration of the alumina sol is higher than 1.5 wt. %, the adhesion between the raw yarn (2) and the thermoplastic resin material (3) is unlikely to increase further.

The concentration of the potassium persulfate is preferably 1.0 to 1.5 wt. %.

In addition to the components as mentioned above, the sizing agent (A) may contain other additives etc., in order to modify the sizing agent.

The additive may include, but not limited to, for example, a solvent, a tackifier, a plasticizer, a curing agent, a crosslink agent, a diluent, a filler, a thickener, and a pigment, etc. Any additive can be used as long as it is ordinarily used for modifying the feature of the sizing agent and is obvious to a person skilled in the art.

Moreover, the sizing agent (A) may contain water (distilled water) in addition to the component as mentioned above.

Moreover, the corona discharge treatment or the plasma treatment to the raw yarn (2) before or after applying the sizing agent (A) can increase the adhesion between the raw yarn (2) and the thermoplastic resin material (3).

While conditions and types for the corona discharge treatment or the plasma treatment to be applied to the raw yarn (2) are not particularly limited, any treatment can be used as long as it can further increase the adhesion of the raw yarn (2) and is obvious to the person skilled in the art.

As shown in FIG. 1.A and FIG. 1.B, the thermoplastic resin material (3) is provided to coat at least a part of the outer peripheral surface of the raw yarn (2) or at least a part of the outer peripheral surface of the thermosetting resin material (4).

Providing the thermoplastic resin material (3) to coat at least a part of the outer peripheral surface of the raw yarn (2) or the thermosetting resin material (4) enables thermoplastic resin material (3) softened by heating to work as an adhesion means for bonding the raw yarn (2) and the thermosetting resin material (4), when the prepreg (1) is heated and molded.

In addition, when the prepreg (1) is heated and molded, the thermoplastic resin material (3) is softened and then cured by the cooling. Thus, even if the thermosetting resin material (4) has been already cured, the prepreg (1) can be molded into a desired shape.

Further, the thermoplastic resin material (3) does not contain the curing agent etc., and thus the thermoplasticity will not be lost over time, even after the prepreg (1) is produced with the thermoplastic resin material (3).

Therefore, using the thermoplastic resin material (3) as an adhesive and molding means can provide the prepreg that has a longer usable period (lifespan) as the molding materials for FRP than the conventional prepreg.

In addition, when the thermoplastic resin material (3) is provided to coat at least a part of the outer peripheral surface of the thermosetting resin material (4), the thermoplastic resin material (3) softened by heating during the molding enters between the raw yarn (2) and the thermosetting resin material (4), providing an adhering and molding effect as mentioned above.

The thermoplastic resin material (3) is preferably shaped into a film, a film-slit tape, or a twisted yarn in order to easily coat the outer peripheral surface of the raw yarn (2) and the thermosetting resin material (4).

The shape of the thermoplastic resin material (3) is not limited to a film, a tape, or a raw yarn, and may include any other shape that enables coating of the outer peripheral surface of the raw yarn (2).

While the thickness of the thermoplastic resin material (3) is not particularly limited, from the viewpoint of easy molding of the prepreg (1), the thickness is preferably 10 to 100 μm, more preferably 10 to 50 μm, most preferably 10 to 25 μm.

If the thickness of the thermoplastic resin material (3) is less than 10 μm, the adhesion between the raw yarn (2) and the thermosetting resin material (4) may be insufficient. If the thickness of the thermoplastic resin material (3) is more than 100 μm, the rate of the thermoplastic resin material (3) in the prepreg (1) may become too high, and thus, the strength of prepreg (1) may be decreased.

While the method of coating the outer peripheral surface of the raw yarn (2) or the thermosetting resin material (4) with the thermoplastic resin material (3) is not particularly limited, the thermoplastic resin material (3) is preferably twisted, one S-twisted and one Z-twisted, on the outer peripheral surface of the raw yarn (2) or the thermosetting resin material (4) (that is, the thermoplastic resin (3) is wound in a X-shape on the outer peripheral surface of the raw yarn (2) or the thermosetting resin material (4)) (See FIG. 4), when the sheet shaped-thermoplastic resin material (3) or the raw yarn thread shaped-thermoplastic material (3) is used.

Due to the S-twisted and the Z-twisted thermoplastic resin material (3) on the outer peripheral surface of the raw yarn (2) or the thermosetting resin material (4), the thermoplastic resin material (3) can be efficiently and uniformly wounded on the outer peripheral surface of the raw yarn (2) or the thermosetting resin material (4). Accordingly, when the prepreg (1) is molded, the thermoplastic resin material (3) can be bonded with the raw yarn (2) and the thermoplastic resin material (4) evenly, uniformly, and easily, thereby enabling the molding of the prepreg (1) into a desired shape with uniform and stable dimension and thickness. Moreover, stability of weight per length of the required raw yarn can be improved.

When the sheet-shaped or the thread-shaped thermoplastic resin material (3) is used, the length of a winding pitch of the thermoplastic resin material (3) may be, but not limited to, preferably 3 to 7 mm, and most preferably 4 to 5 mm Setting the length of the pitch to 3 to 7 mm enables the thermoplastic resin material (3) to be wounded on the raw yarn (2) or the thermosetting resin material (4) uniformly and efficiently.

When the sheet-shaped or the thread-shaped thermoplastic resin material (3) is used, a width of the thermoplastic resin material (3) may be, but not limited to, preferably 1.0 to 3.5 mm, and most preferably 1.5 to 1.8 mm.

A coating ratio of the thermoplastic resin material (3) to the area of the outer peripheral surface of the raw yarn (2) or the thermosetting resin material (4) is not particularly limited, but preferably 30% or more, and most preferably 50% or more.

If the coating ratio of the thermoplastic resin material (3) to the area of the outer peripheral surface of the raw yarn (2) or the thermosetting resin material (4) is less than 30%, the adhesion between the raw yarn (2) and the thermosetting resin material (4) may be decreased when the prepreg (1) is molded by pressurization and heating. Accordingly, it fails to mold the prepreg (1) into a desired shape.

Providing the thermoplastic resin material (3) with the corona discharge treatment and the plasma treatment can increase the adhesion between the raw yarn (2) and the thermosetting resin material (4).

This is because the corona discharge treatment or the plasma treatment leave fine scratches on surface of the thermoplastic resin material (3) to increase the adhesion between the raw yarn (2) and the thermosetting resin material (4).

While types and conditions of the corona discharge treatment or the plasma treatment that are applied to the thermoplastic resin material (3) are not particularly limited, any treatment can be used as long as it can increase the adhesion of the thermoplastic resin material (3) and is obvious to the person skilled in the art.

A material of the thermoplastic resin material (3) used for prepreg (1) can include, but not limited to, any thermoplastic material, such as nylon 6, nylon 66, polyester, PFA, polyethylene, polypropylene, polyvinyl chloride, polystyrene, polyvinyl acetate, polyurethane, PTFE, PET, ABS, AS, acryl, polyamide, polyacetal, polycarbonate, cyclic polyolefin, polyphenylene sulfide, polysulphone, polyether sulphone, FEP, ETFE, PCTFE, and PVD.

As shown in FIG. 1.A and FIG. 1.B, the thermosetting resin material (4) is provided to coat at least a part of the outer peripheral surface of the raw yarn (2) or the thermoplastic resin material (3).

The thermosetting resin material (4) is preferably a film, a film-slit tape, or a single twisted yarn or a double twisted yarn in order to enable the easy coating of the outer peripheral surface of the raw yarn (2) or the thermoplastic resin material (3).

The shape of the thermosetting resin material (4) is not limited to a film, a tape, or a raw yarn, and may include any other shape that enables coating of the outer peripheral surface of the raw yarn (2) or the thermoplastic resin (3).

From the viewpoint of ease of the molding of the prepreg (1), the thickness of the thermosetting resin material (4) is preferably 10 to 100 µm, more preferably 10 to 50 µm, and most preferably 10 to 25 µm.

If the thickness of the thermosetting resin material (4) is less than 10 µm, properties such as tension, compression, and bending strength attributed to the thermosetting resin material (4) may not be provided to the prepreg (1). If the thickness of the thermosetting resin material (4) is more than 100 µm, the rigidity attributed to the thermosetting resin material (4) may become too high, and thus the prepreg (1) is unlikely to be bended, failing to mold the prepreg (1) into a desired shape.

A method of coating the outer peripheral surface of the raw yarn (2) or the thermoplastic resin material (3) with the thermosetting resin material (4) is not particularly limited, but when the sheet-shaped or the thread-shaped thermosetting resin material (4) is used, it is preferably S-twisted and Z-twisted on the outer peripheral surface of the raw yarn (2) or the thermoplastic resin material (3). (that is, thermosetting resin material (4) is wound in a X-shape on the outer peripheral surface of the raw yarn (2) or the thermoplastic resin (3)).

The S-twisted and Z-twisted thermosetting resin material (4) on the outer peripheral surface of the raw yarn (2) or the thermoplastic resin material (3) can easily impart the rigidity of the thermosetting resin material (4) to the prepreg (1) and increase ease of the processing of the thermosetting resin material (4).

In addition, S-twist and Z-twist of the thermosetting resin material (4) on the outer peripheral surface of the raw yarn (2) or the thermoplastic resin material (3) can be automated, and thus it allows easier production of the prepreg (1). Since the thermosetting resin material (4) can be efficiently or uniformly wounded on the outer peripheral surface of the raw yarn (2) or thermoplastic resin material (3), when the prepreg (1) is molded, the thermosetting resin material (4) can be bonded with the raw yarn (2) and the thermoplastic resin material (3) evenly, uniformly, and easily, thereby enabling the molding of the prepreg (1) into a desired shape.

When the sheet-shaped or the thread-shaped thermosetting resin material (4) is used, the length of a winding pitch of the thermosetting resin material (4) is, but not particularly limited to, preferably 3 to 7 mm, and most preferably 4 to 5 mm Setting the length of the pitch to 3 to 7 mm enables the thermosetting resin material (4) to be wounded on the thermoplastic resin material (3) uniformly and efficiently. When the sheet-shape or the thread-shaped thermosetting resin material (4) is used, a width of the thermosetting resin material (4) is, but not particularly limited to, preferably 1.0 to 3.5 mm and most preferably 1.5 to 1.8 mm.

A coating ratio of the thermosetting resin material (4) to the area of the outer peripheral surface of the raw yarn (2) or the thermoplastic resin material (3) is, but not limited to, preferably 30% or more, most preferably 50%.

If the coating ratio of the thermosetting resin material (4) to the area of the outer peripheral surface of the raw yarn (2) or the thermoplastic resin material (3) is less than 30%, the prepreg (1) may have some parts having large unevenness in thickness and strength during the molding by pressurization and heating and the prepreg (1) may not obtain sufficient rigidity.

A volume ratio of the raw yarn (2), the thermoplastic resin material (3), and the thermosetting resin material (4) in the prepreg (1) is preferably raw yarn 45 to 60%: thermoplastic resin material 25 to 30%:and thermosetting resin material 15 to 25%, most preferably raw yarn 51%:the thermoplastic resin material 25%:and the thermosetting resin material 24%.

Setting the volume ratios of the raw yarn (2), the thermoplastic resin material (3), and the thermosetting resin material (4) in the prepreg (1) as mentioned above is able to not only improve properties of the prepreg (1) such as tension strength, compression strength, and bending strength but also provide remarkable moldability.

Subjecting the thermosetting resin material (4) to the corona discharge treatment or the plasma treatment can provide the thermosetting resin material (4) with the increased adhesion with the thermoplastic resin material (3).

This is because the corona discharge treatment or the plasma treatment leave small scratches on the surface of the thermosetting resin material (4) to increase the adhesion between the raw yarn (2) and the thermoplastic resin material (3).

Moreover, the corona discharge treatment or the plasma treatment may be applied to form a hole (a punch hole) in the thermosetting resin material (4). This enables the thermoplastic resin material (3) softened during heating to be bonded with the thermosetting resin material (4) more easily.

While types and conditions of the corona discharge treatment or the plasma treatment that are applied to the thermosetting resin material (4) are not particularly limited, any treatment can be used as long as it can increase the adhesion of the thermosetting resin material (4) and is obvious to the person skilled in the art.

A resin material whose polymerization reaction has already been completed by heating is used for the thermosetting resin material (4) to be used for the prepreg (1).

Use of the thermosetting resin material (4) already polymerized (that is, cured) by heating does not cause the problem of the conventional prepreg that the polymerization of the thermosetting resin material progresses over time, making the thermosetting resin material unavailable for molding.

The cured thermosetting resin material (4) works as an aggregate to provide the prepreg (1) with the rigidity such as tension, compression, and bending strength.

The thermosetting resin material (4) used for the prepreg (1) according to the present invention is provided to coat an outer peripheral surface of the thermoplastic resin material (3) coating the outer peripheral surface of the raw yarn (2) subjected to the sizing treatment, and the thermosetting resin material is not impregnated directly into the raw yarn unlike the conventional prepreg.

Therefore, the prepreg (1) according to the present invention can be molded into a desired shape by the raw yarn (2) and the thermoplastic resin material (3) during molding, and even if the cured thermosetting resin material (4) is used, the prepreg (1) can be molded into a desired shape.

In this way, just heating the prepreg (1) up to a temperature when the thermoplastic resin material (3) softens allows the molding of the prepreg (1) into a desired shape. Accordingly, it eliminates the need of a large equipment for molding of the prepreg, thereby improving the productivity of FRP.

The material of the thermosetting resin material (4) used for the prepreg (1) may include, but not limited to, any thermosetting resin that is normally used for the prepreg.

For example, the material of the thermosetting resin material (4) may include epoxy, unsaturated polyester, vinyl ester, bismaleimide, phenol, cyanate, and polyimide.

In addition, a composite material made by bonding the thermoplastic resin material (3) and the thermosetting resin material (4) to each other can be used for these resins.

The prepreg (1) can be also used as the woven fabric shape or the knitted fabric shape.

When the woven fabric prepreg (1) is single-layered or multi-layered, both cases of the prepreg (1) can be automatically cut and thus are suitable for mass production and large production.

The prepreg (1) in the knitted fabric shape can be automatically obtained by knitting and thus is suitable for the molding of small articles. The woven fabric prepreg (1) and the knitted fabric prepreg (1) can be easily molded into a desired shape.

After the prepreg (1) and the woven fabric or knitted fabric prepreg (1) are filled in a desirable shaped mold, they are heat-molded and press-molded by a hot press into a desired shape.

Heating the prepreg (1) beyond a temperature when the thermoplastic resin material (3) softens enables the molding of the prepreg (1). This temperature depends on a thermoplastic resin used for the thermoplastic resin material (3), and the prepreg (1) can be molded by heating and pressing at a temperature of 120 to 410° C. for 15 to 45 minutes.

The method of producing the prepreg (1) according to the present invention will be described as below.

Figure 2:
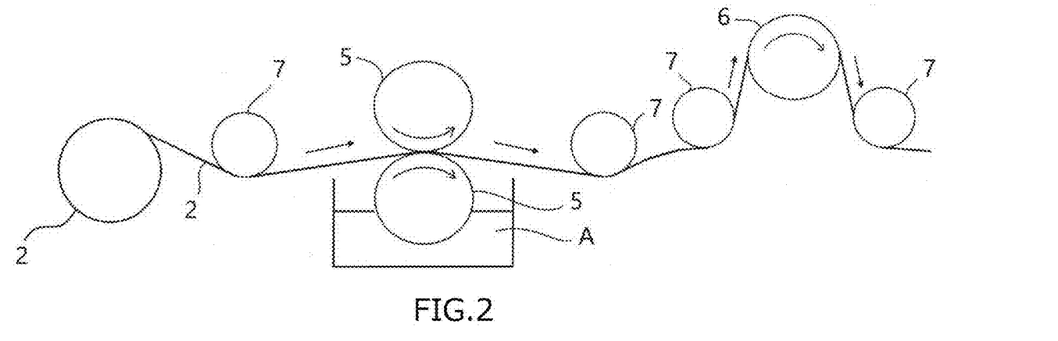
FIG. 2 is a schematic explanatory view of a method of producing a prepreg according to the present invention, illustrating a first step of subjecting the raw yarn to the sizing treatment.
Figure 3:
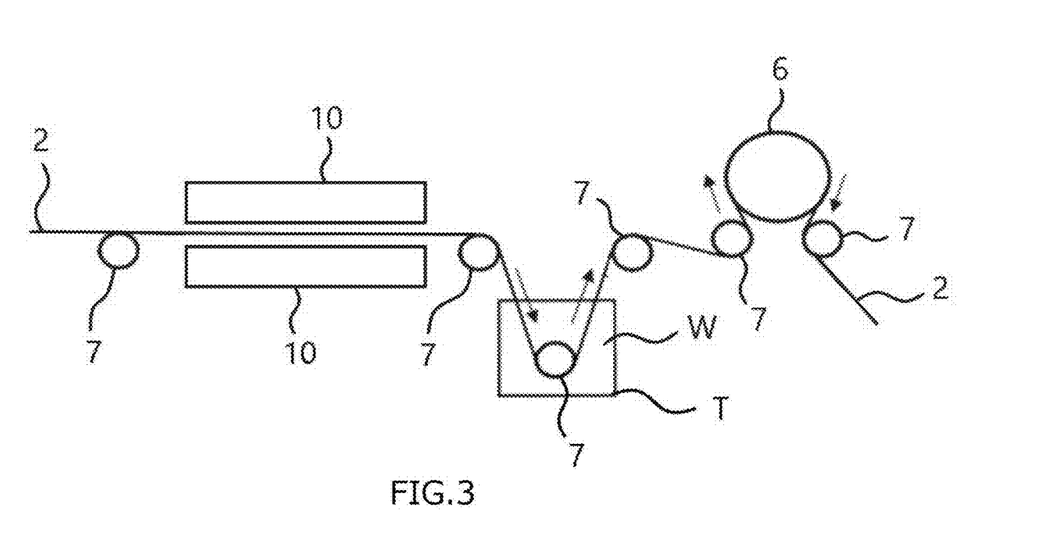
FIG. 3 is a schematic explanatory view of a method of producing a prepreg according to the present invention, illustrating a step of subjecting to the corona discharge treatment the raw yarn subjected to the sizing treatment.
Figure 4:
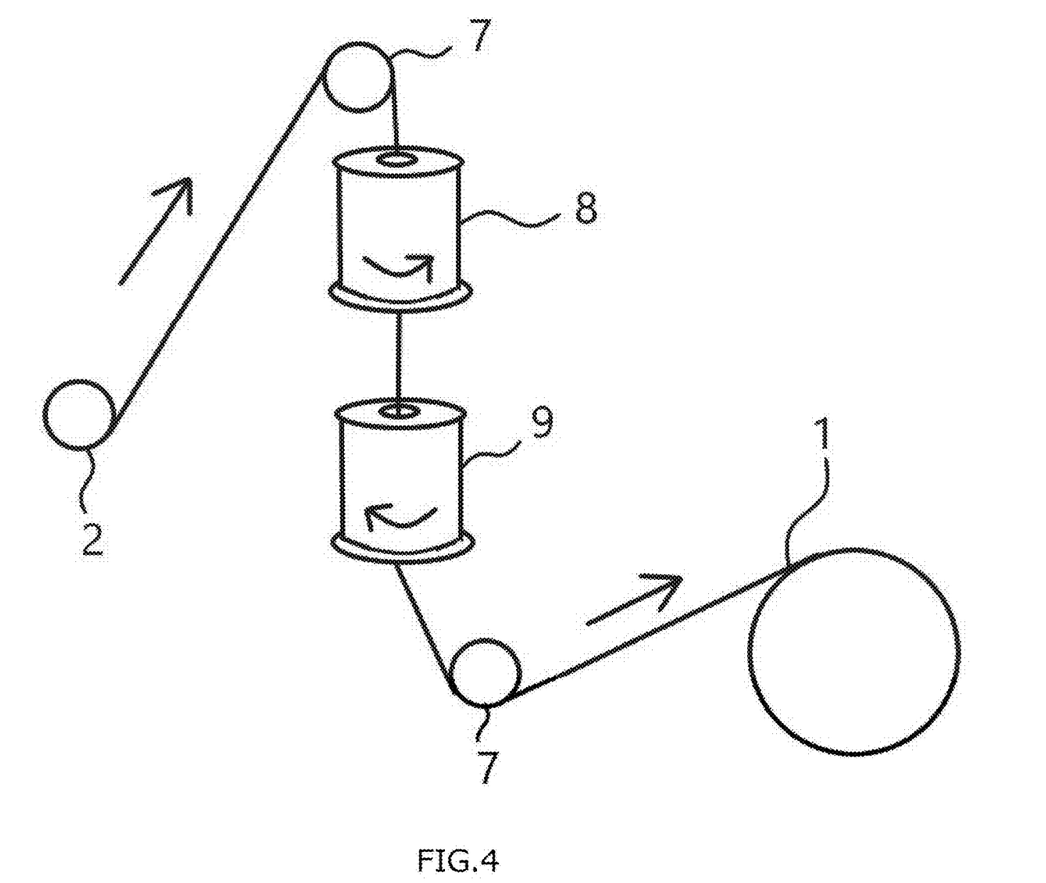
FIG. 4 is a schematic explanatory view of the producing method of the prepreg according to the present invention, illustrating a second step of coating the raw yarn subjected to the sizing treatment with the thermoplastic resin material or the thermosetting resin material, and a third step of coating the thermoplastic resin material with the thermosetting resin material or coating the thermosetting resin material with the thermoplastic resin material.

FIG. 2 is a schematic explanatory view of a method of producing the prepreg according to the present invention, illustrating a first step of subjecting the raw yarn to the sizing treatment. FIG. 3 is a schematic explanatory view of a method of producing the prepreg according to the present invention, illustrating the step of subjecting to the corona discharge treatment the raw yarn subjected to the sizing treatment. FIG. 4 is a schematic explanatory view of the producing method of the prepreg according to the present invention, illustrating the second step of coating the raw yarn subjected to the sizing treatment with the thermoplastic resin material or the thermosetting resin material, and illustrating the third step of coating the thermoplastic resin material with the thermosetting resin material or coating the thermosetting resin material with the thermoplastic resin material.

Arrows shown in FIG. 2 to FIG. 4 show directions to feed the raw yarn (2) and the prepreg (1).

The method of producing the prepreg (1) comprises a first step of subjecting a sizing treatment to a raw yarn (2), a second step of coating the raw yarn (2) subjected to the sizing treatment with a thermoplastic resin material (3) or a thermosetting resin material (4) and a third step of coating the thermoplastic resin material (3) with the thermosetting resin material (4), or the thermosetting resin material (4) with the thermoplastic resin material (3).

As shown in FIG. 2, in the first step, the raw yarn (2) is fed to directions indicated by the arrows in the figures and the sizing agent (A) is applied by an application roller (5). The sizing agent (A)-applied raw yarn (2) is dried as it moves on a heated drying roller (6).

In FIG. 2, the sizing agent (A) is applied to the raw yarn (2) by the application roller (5), but a method of applying the sizing agent (A) may include, but not limited to, any method of applying the sizing agent (A) to the raw yarn (2) such as spraying the sizing agent (A) to the raw yarn (2) or immersing the raw yarn (2) into the sizing agent (A) etc.

Also, a method of drying the sizing agent (A)-applied raw yarn (2) may include, but not limited to, the drying roller shown in FIG. 2, and any method of drying the sizing agent (A)-applied raw yarn (2) such as air drying, heat drying, or decompression drying of the sizing agent (A)-applied raw yarn (2).

In addition, FIG. 2 to FIG. 4, show that the raw yarn (2) is conveyed through the conveying roller (7), but the methods for conveying the raw yarn (2) is not particularly limited.

As shown in FIG. 3, the method may include a step of subjecting to the corona discharge treatment or the plasma treatment the raw yarn (2) subjected to the sizing treatment after the first step and before the second step.

Specifically, the raw yarn (2) is passed through a corona discharge treatment or plasma treatment apparatus (10) to be subjected to the corona discharge treatment or the plasma treatment.

In addition, the corona discharge treatment or plasma treatment apparatus (10) used in this step may include, but not limited to, any apparatus that can apply the corona discharge treatment or the plasma treatment to the raw yarn (2) subjected to the sizing treatment.

The corona discharge treatment is performed preferably at 5 to 400 W·min/m$^2$ and more preferably at 50 W·min/m$^2$.

The raw yarn (2) subjected to the corona discharge treatment or the plasma treatment is passed through in a tank (T) containing water to be washed.

Washing the raw yarn (2) subjected to the corona discharge treatment or the plasma treatment with water eliminates excessive impurities and reduces the functional group (OH group) adhered to the raw yarn (2) and derived from the sizing agent by approximately one-tenth (1/10) to one-fifteenth (1/15). In this way, the moderate reduction of the functional group can increase the adhesion between the raw yarn (2) and the thermoplastic resin material (3).

Water used for washing the raw yarn (2) subjected to the corona discharge treatment or the plasma treatment is preferably at 70 to 80° C. from the viewpoint that the functional group (OH group) adhered to the raw yarn (2) can be reduced by approximately one-tenth (1/10) to one-fifteenth (1/15).

The raw yarn (2) washed by water is dried as it moves on the heated drying roller (6).

A method of drying the raw yarn (2) washed by water may include, but not limited to, the drying roller shown in FIG. 3, and any method of drying the raw yarn (2) washed by water such as air drying, heat drying, or decompression-drying of the raw yarn (2).

As shown in FIG. 4, in the second step, the thermoplastic resin material (3) or the thermosetting resin material (4) is S-twisted and Z-twisted on the raw yarn (2) subjected to the sizing treatment by a first covering means (8) and a second covering means (9).

While the order of the S-twist and the Z-twist is not particularly limited, the thermoplastic resin material (3) or the thermosetting resin material (4) may be S-twisted by the first covering means (8), and then the thermoplastic resin material (3) or the thermosetting resin material (4) may be Z-twisted by the second covering means (9). The thermoplastic resin material (3) or the thermosetting resin material (4) may be coated in the reverse order (that is, by Z-twist and then S-twist).

Moreover, the number of the covering means to be placed may be, but not particularly limited to, one, two, three, four, and five or more to coat the thermoplastic resin material (3) or the thermosetting resin material (4) in a desired state.

The covering means may include, but not particularly limited to, any means that enables coating of the raw yarn.

In addition, the method of coating the thermoplastic resin material (3) or the thermosetting resin material (4) may include, but not limited to, the method shown in FIG. 4, and for example, any method to coat the outer periphery of the raw yarn (2) with the thermoplastic resin material (3) or the thermosetting resin material (4) such as S-twisting or Z-twisting of the thermoplastic resin material (3) or the thermosetting resin material (4), or bonding of the thermoplastic resin material (3) or the thermosetting resin material (4) with the raw yarn (2) by the use of the compression bonding or the adhesive agent, etc.

As shown in FIG. 4, in the third step, the thermosetting resin material (4) is S-twisted and Z-twisted to coat the outer periphery of the thermoplastic resin material (3), or the thermoplastic resin material (3) is S-twisted and Z-twisted to coat the outer periphery of the thermosetting resin material (4), by the first covering means (8) and the second covering means (9) on the raw yarn (2) coated by the thermoplastic resin material (3) or the thermosetting resin material (4).

While the order of the S-twist and the Z-twist is not particularly limited, the thermoplastic resin material (3) or the thermosetting resin material (4) may be S-twisted by the first covering means (8), and then the thermoplastic resin material (3) or the thermosetting resin material (4) may be Z-twisted by the second covering means (9).

The thermoplastic resin material (3) or the thermosetting resin material (4) may be coated in the reverse order (that is, by the Z-twist then the S-twist).

Moreover, the number of the covering means to be placed may be, but not particularly limited to, one, two, three, four, and five or more to coat the thermoplastic resin material (3) or the thermosetting resin material (4) in a desired state.

The covering means is not particularly limited and may include any means that enables coating the raw yarn.

In addition, the method of coating the thermoplastic resin material (3) or the thermosetting resin material (4) may include, but not limited to, the method shown in FIG. 4, and for example, any method to coat the outer periphery of the thermoplastic resin material (3) with the thermosetting resin material (4) or the outer periphery of thermosetting resin material (4) with the thermoplastic resin material (3) such as S-twisting or Z-twisting of the thermoplastic resin material (3) or the thermosetting resin material (4), or bonding of the thermoplastic resin material (3) or the thermosetting resin material (4) with the raw yarn (2) by the use of the compression bonding and the adhesive agent, etc.

EXAMPLE

While the present invention will be described more specifically with reference to examples and comparative examples, these examples are not intended to limit the present invention.

The following test was conducted to check if the prepreg according to the present invention has a longer usable period (lifespan) as the molding material for FRP than the conventional prepreg.

<Examples>

The prepreg according to the present invention used as the Example was produced with the use of the following materials.

Yarn: 12K carbon fiber (KUREHA CORPORATION, pitch-based, three ply)

Sizing agent: Potassium persulfate (FUJIFILM Wako Pure Chemical Corporation) 1.5 wt. %, Alumina sol (Kawaken Fine Chemicals Co., Ltd. 10-A) 2.0 wt. %, PVA (Denka Company Limited) 5.0 wt. %, Water 88.5 wt. %, PTFE (Daikin, LTD. D-111) 3 wt. %

Thermoplastic resin material: Nylon 66 (SUNTEX Co., Ltd.)

Thermosetting resin material: Tough crest film (Sumitomo Seika Chemicals Co., Ltd. PI 70%, clay 30%, and thickness 25 μm)

The prepreg according to the present invention was produced with materials mentioned above by the following method.

First, a sizing agent was applied to a raw yarn through a coating roller, and then the raw yarn is dried by a drying roller.

Second, a yarn of a thermoplastic resin material (diameter: 30 μm) was wounded around the raw yarn with S-twist and Z-twist at 6 mm pitch by the first covering means and the second covering means.

Finally, the thermosetting resin material (slit at 2.0 mm width) was wounded around the outer peripheral surface of the thermoplastic resin material with S-twist and Z-twist at 6 mm pitch by the first covering means and the second covering means to produce the prepreg for this example.

In addition, the ratio of the carbon fiber to the thermoplastic and the thermosetting resin materials in the prepreg was carbon fiber 51 wt. % and both resin materials 49 wt. %.

Next, eighteen prepregs of this example were prepared, braided at 16×16 mm of a square shape, and rolled into a rectangular shape by a roller rolling.

The prepregs rolled into the rectangular shape were filled in molds, heated and pressurized at 385° C. for 20 minutes (200 kg/cm2) and then cooled by cold water to produce the molded products (joint members).

Figure 5:
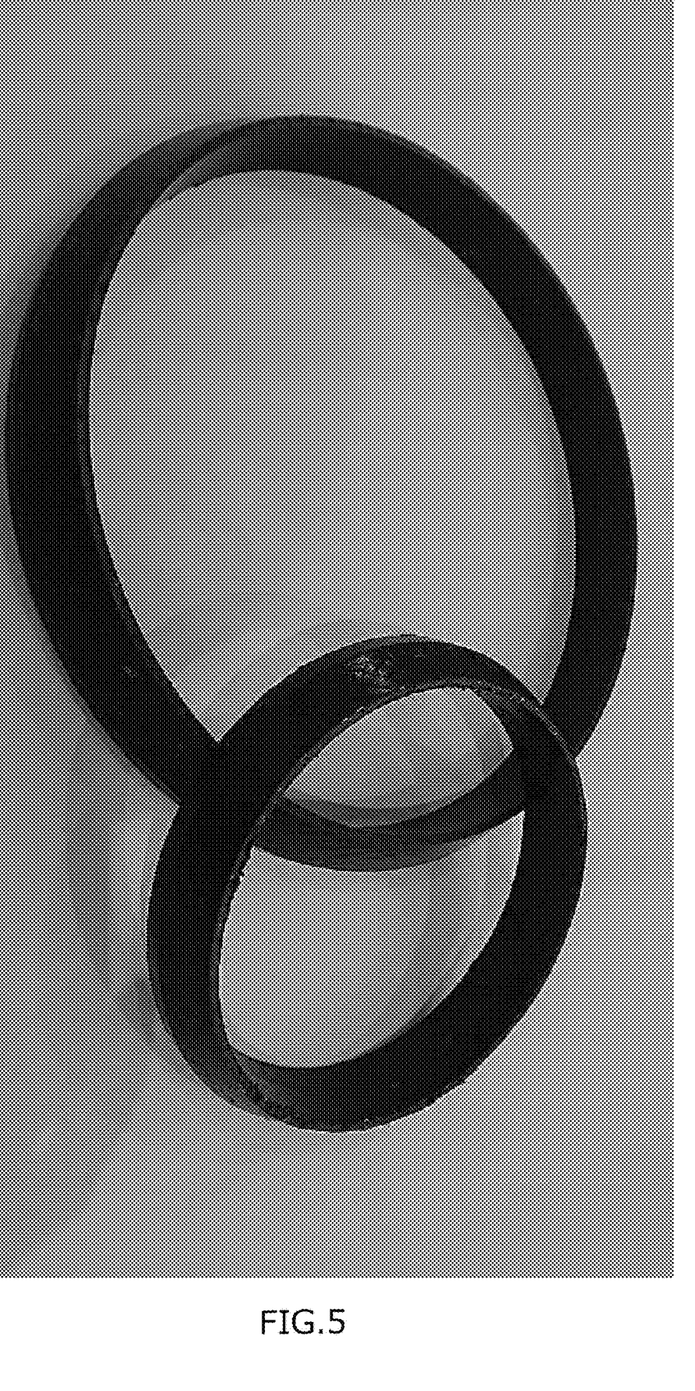
FIG. 5 is an image of a product (a joint member) produced by molding the prepreg according to the present invention.

FIG. 5 is a picture of the product produced by molding the prepreg.

As shown in FIG. 5, it was found that use of the prepregs according to the present invention enabled the production of a product molded into a desired shape.

Next, the produced prepregs in the example were tested for a usable period (lifespan) as a molding material for FRP.

The prepregs produced in this way as mentioned above were stored at 25° C. The prepregs 20 days and 60 days after production were used to produce products (joint members).

The method of producing the product is the same as the method mentioned above.

Figure 6:
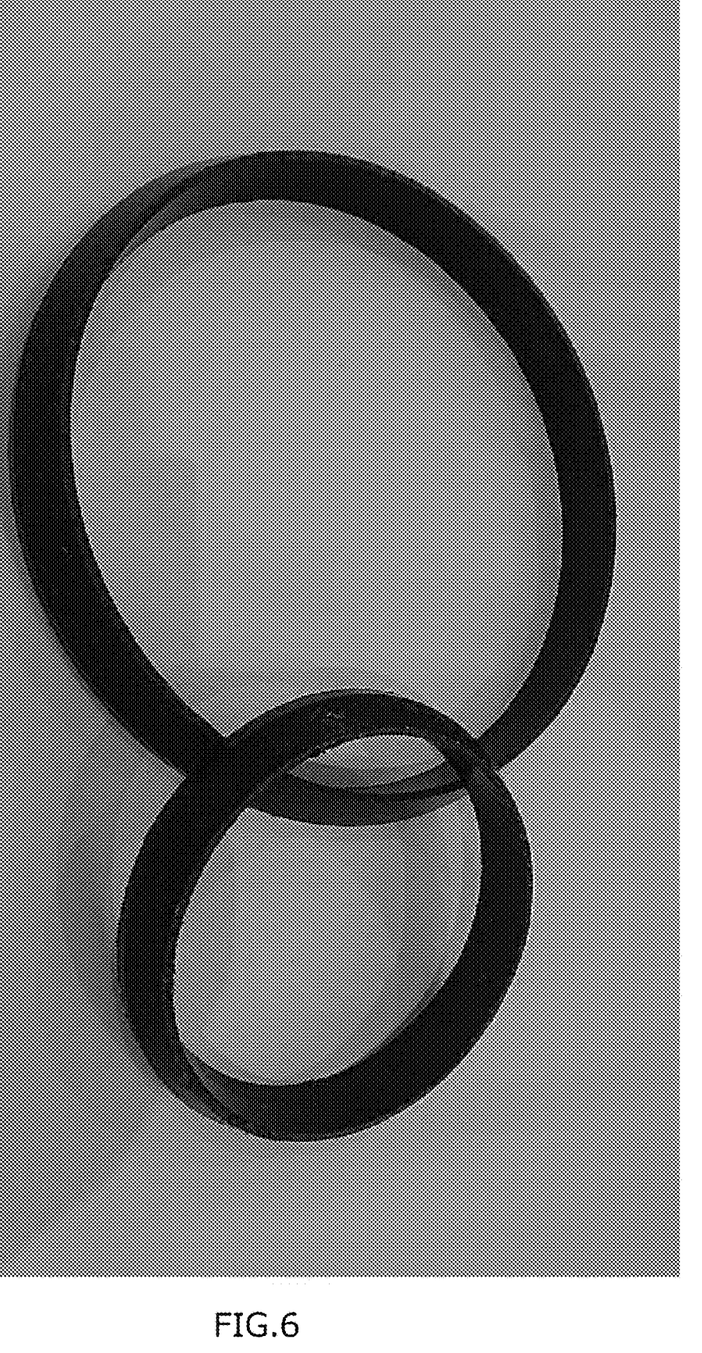
FIG. 6 is an image of a product (joint member) produced by molding the prepreg (60 days after production) according to the present invention.

FIG. 6 is a picture of the product produced by molding the prepreg 60 days after production in the example.

As shown in FIG. 6, it was found that the prepreg even 60 days after production according to the present invention can be used for FRP molding materials, as well as the prepreg just after the production.

It was found that the prepreg even 2 days after production in this example can be used to produce the same product as in FIG. 5, as well as the prepreg just after production (not illustrated).

Further, the prepreg produced by S-twisting and Z-twisting the thermosetting resin material on the raw yarn and by S-twisting and Z-twisting a yarn of the thermoplastic resin material on the outer peripheral surface of the thermosetting resin (60 days after production) can also be used to produce the product as well as the above-mentioned prepreg mentioned in this example.

In this way, the prepreg according to the present invention has a longer usable period (lifespan) as the molding material for FRP since the prepreg comprises the cured thermosetting resin material.

<Comparative Example>

The prepreg as a comparative example was produced with the use of the following materials.

Raw yarn: 12K carbon fiber (KUREHA CORPORATION, pitch type, three ply)

Thermosetting resin material: bisphenol A epoxy resin material (liquid) twenty parts, bisphenol A epoxy resin material (solid) eighty parts, dicyandiamide (curing agent) five parts, aromatic urea (curing accelerator) five parts, or epoxy resin comprising 50:50 mixture of methyl ethyl ketone and methanol hundred parts The prepreg for the comparative example was produced with the use of the above-mentioned materials by the following method.

The raw yarn was impregnated with the thermosetting resin material by immersion, and then is heat-dried to produce the prepreg of the comparative example having the semi-cured thermosetting materials.

After the prepreg of the comparative example produced in the above-mentioned method is kept at 25° C. for 20 days, it was supposed to be molded to produce a product (joint member), as well as the prepreg of the example. However, the curing reaction of the thermosetting resin material in the prepreg proceeded, and thus the prepreg itself of comparative example was being cured.

Therefore, the prepreg of the comparative example could not be filled in a mold, failing to produce a product.

From the test results for the examples and the comparative example as mentioned above, it was found that the prepreg according to the present invention has a remarkable effect that it has a longer usable period (lifespan) as the molding material for FRP than the conventional prepreg and that even a prepreg 60 days after production can be easily molded into a desired shape.

INDUSTRIAL APPLICABILITY

The prepreg according to the present invention comprises a raw yarn treated with a sizing agent, a thermoplastic resin material, and a thermosetting resin material, the thermoplastic resin material coats at least a part of the outer peripheral surface of the raw yarn, the thermosetting resin material coats at least a part of the outer peripheral surface of the thermoplastic resin material, or the thermosetting resin material coats at least a part of the outer peripheral surface of the raw yarn, the thermoplastic resin material coats at least a part of the outer peripheral surface of the thermosetting resin material, the thermosetting resin material is polymerized by heating, and thus the curing reaction of the thermosetting resin material does not proceed over time, unlike the conventional prepreg.

The thermoplastic resin material coats at least a part of the outer peripheral surface of the raw yarn subjected to the sizing treatment or the outer peripheral surface of the thermosetting resin material, and thus even if the thermosetting resin material has been already polymerized by heating, the thermoplastic resin material becomes a molding material to mold the prepreg into a desired shape, enabling the production of the prepreg to be molded into a desired shape.

In addition, the prepreg may be heated, not need to be fired, to a temperature when the thermoplastic resin material is softened, allowing easier molding than the conventional prepreg.

Therefore, the prepreg according to the present invention has a remarkable effect that it has a longer usable period (lifespan) as the molding material for FRP than the conventional prepreg and that it can be easily molded.

Moreover, the method of producing the prepreg according to the present invention enables production of the prepreg having a remarkable characteristic as mentioned above.

Therefore, the present invention can be widely used as the prepreg for material of FRP and the producing method thereof.

EXPLANATION OF SYMBOLS

1 Prepreg
2 Raw Yarn

3 Thermoplastic Resin
4 Thermosetting Resin
5 Coating Roller
6 Drying Roller
7 Conveying Roller
8 First Covering means
9 Second Covering means
10 Corona discharge treatment or Plasma Treatment Apparatus
A Sizing agent
T Tank
W Water

The invention claimed is:

1. A method of producing a prepreg comprising:
a first step of applying a sizing treatment to a raw yarn,
a second step of coating at least a part of an outer peripheral surface of said raw yarn subjected to a sizing treatment with a thermoplastic resin material, and
a third step of coating at least a part of an outer peripheral surface of said thermoplastic resin material with a thermosetting resin material,
wherein said thermosetting resin material is polymerized by heating,
wherein said second step is a step to S-twist and Z-twist, and coat at least a part of the outer peripheral surface of said raw yarn subjected to a sizing treatment with said thermoplastic resin material, and/or, wherein said third step is a step to S-twist and Z-twist, and coat at least a part of the outer peripheral surface of said thermoplastic resin material with said thermosetting resin material.

2. The method according to claim 1, wherein said second step is a step to coat at least a part of the outer peripheral surface of said raw yarn subjected to a sizing treatment with the S-twisted thermoplastic resin material and the Z-twisted thermoplastic resin material, and/or
wherein said third step is a step to coat at least a part of the outer peripheral surface of said thermoplastic resin material with the S-twisted thermosetting resin material and the Z-twisted thermosetting resin material.

3. The method according to claim 1, wherein a sizing agent used for the sizing treatment in said first step contains potassium persulfate, alumina sol, and PVA.

4. The method according to claim 1, further comprising a step of subjecting to a corona discharge treatment said raw yarn subjected to the sizing treatment after said first step.

5. A method of producing a prepreg comprising:
a first step of applying a sizing treatment to a raw yarn,
a second step of coating at least a part of an outer peripheral surface of said raw yarn subjected to a sizing treatment with a thermosetting resin material, and
a third step of coating at least on a part of an outer peripheral surface of said thermosetting resin material with a thermoplastic resin material,
wherein said thermosetting resin material is polymerized by heating,
wherein said second step is a step to S-twist and Z-twist, and coat at least a part of the outer peripheral surface of said raw yarn subjected to the sizing treatment with said thermosetting resin material, and/or wherein said third step is a step to S-twist and Z-twist, and coat at least a part of the outer peripheral surface of said thermosetting resin material with said thermoplastic resin material.

6. The method according to claim 5, wherein said second step is a step to coat at least a part of the outer peripheral surface of said raw yarn subjected to the sizing treatment with the S-twisted thermosetting resin material and the Z-twisted thermosetting resin material, and/or
wherein said third step is a step to coat at least a part of the outer peripheral surface of said thermosetting resin material with the S-twisted thermoplastic resin material and the Z-twisted thermoplastic resin material.

* * * * *